(12) United States Patent
Kim et al.

(10) Patent No.: US 7,952,679 B2
(45) Date of Patent: May 31, 2011

(54) DISPLAY PANEL, METHOD FOR MANUFACTURING THE SAME, MOTHERBOARD FOR MANUFACTURING THE SAME AND METHOD FOR MANUFACTURING A DISPLAY SUBSTRATE FOR THE SAME

(75) Inventors: Hyun-Young Kim, Suwon-si (KR); Kwan-Wook Jung, Suwon-si (KR); Hyung-Don Na, Seoul (KR); Seung-Gyu Tae, Suwon-si (KR); Jung-Yun Kim, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 423 days.

(21) Appl. No.: 12/033,645

(22) Filed: Feb. 19, 2008

(65) Prior Publication Data

US 2008/0198287 A1 Aug. 21, 2008

(30) Foreign Application Priority Data

Feb. 20, 2007 (KR) .................. 10-2007-0016893

(51) Int. Cl.
*G02F 1/1339* (2006.01)

(52) U.S. Cl. .................. 349/153; 349/151; 349/190

(58) Field of Classification Search .................. 349/153
See application file for complete search history.

(56) References Cited

U.S. PATENT DOCUMENTS

| | | | |
|---|---|---|---|
| 6,055,034 A * | 4/2000 | Zhang et al. | 349/151 |
| 6,424,401 B1 * | 7/2002 | Kang et al. | 349/153 |
| 7,382,421 B2 * | 6/2008 | Hoffman et al. | 349/43 |
| 7,474,375 B2 * | 1/2009 | Kwak et al. | 349/153 |
| 7,595,859 B2 * | 9/2009 | Park | 349/190 |
| 2005/0024575 A1 * | 2/2005 | Kwak et al. | 349/153 |

* cited by examiner

*Primary Examiner* — Richard H Kim
(74) *Attorney, Agent, or Firm* — F. Chau & Associates, LLC (57) ABSTRACT

A display panel includes a first substrate, a thin-film transistor (TFT), an organic layer, a second substrate, a seal line, and a conductive pattern. The first substrate includes a pixel part and a driving part connected to the pixel part. The TFTs are formed in the pixel part and the driving part. The organic layer is formed on the first substrate having the TFTs formed thereon. The second substrate is opposite to the first substrate. The seal line is disposed between an edge portion of the first substrate having the organic layer formed thereon and an edge portion of the second substrate. The seal line combines the first substrate with the second substrate. The conductive pattern is disposed between the seal line and the organic layer.

10 Claims, 6 Drawing Sheets

DISPLAY PANEL, METHOD FOR MANUFACTURING THE SAME, MOTHERBOARD FOR MANUFACTURING THE SAME AND METHOD FOR MANUFACTURING A DISPLAY SUBSTRATE FOR THE SAME

CROSS-REFERENCE TO RELATED APPLICATION

This application claims priority under 35 U.S.C. §119 to Korean Patent Application No. 2007-16893, filed on Feb. 20, 2007 in the Korean Intellectual Property Office (KIPO), the contents of which are herein incorporated by reference in their entirety.

BACKGROUND OF THE INVENTION

1. Technical Field

The present invention relates to a display panel, a method for manufacturing the display panel, a motherboard for manufacturing the display panel, and a method for manufacturing a display substrate for the display panel.

2. Discussion of the Related Art

A display panel displaying an image includes a first substrate, a second substrate facing the first substrate and a liquid crystal layer interposed between the first substrate and the second substrate. The first substrate includes a thin-film transistor (TFT) formed in each pixel to independently drive the pixel.

The display panel includes a display area displaying the image and a peripheral area surrounding the display area. A plurality of pixels are formed in the display area of the first substrate. A gate line, a data line and a TFT are formed in each of the pixels. A gate driver applying a gate signal to the gate line is formed in the peripheral area of the first substrate.

To prevent corrosion of metal formed in the pixel and the gate driver, a display panel including a thick organic layer formed on the pixel and the gate driver has been developed. To decrease an area of the display panel, widths of a black matrix and a seal line of the display panel have been decreased. The black matrix is formed in the peripheral area of the second substrate. The seal line combines the first substrate with the second substrate.

However, when the width of the seal line is decreased in the display panel having the organic layer remaining under the seal line, adhesive strength between the first substrate and the second substrate is decreased so that the first substrate can be spaced apart from the second substrate. In addition, since the gate driver includes a plurality of areas in which a gate metal is in contact with a data metal, the metal may corrode in contact holes, through which the gate metal is in contact with the data metal. The contact holes pass through a gate insulating layer and the organic layer.

SUMMARY OF THE INVENTION

Embodiments of the present invention provide a display panel capable of preventing separation of a first substrate and a second substrate and corrosion of a gate driving part to improve display quality, a method for manufacturing the display panel and a motherboard for manufacturing the display panel.

The present invention further provides a method for manufacturing a display substrate capable of preventing corrosion of a gate driving part and decreasing defects caused by static charge.

A display panel according to an exemplary embodiment of the present invention includes a first substrate, a thin-film transistor (TFT), an organic layer, a second substrate, a seal line, and a conductive pattern. The first substrate includes a pixel part and a driving part connected to the pixel part. The TFTs are formed in the pixel part and the driving part. The organic layer is formed on the first substrate having the TFTs formed thereon. The second substrate is opposite to the first substrate. The seal line is disposed between an edge portion of the first substrate having the organic layer formed thereon and an edge portion of the second substrate. The seal line combines the first substrate with the second substrate. The conductive pattern is disposed between the seal line and the organic layer.

The conductive pattern includes a metal or a metal oxide. For example, the first substrate may further include a pixel electrode formed on the organic layer corresponding to the pixel part and the conductive pattern is formed from substantially the same layer as the pixel electrode.

The conductive pattern may overlap the seal line. In an exemplary embodiment, the conductive pattern may be formed on the driving part.

In a method for manufacturing a display substrate according to an exemplary embodiment of the present invention, TFTs are formed in a pixel part and a driving part of the first substrate. The driving part is connected to the pixel part. An organic layer is formed on the first substrate having the TFTs formed thereon. A conductive pattern is formed on a portion of the organic layer. A second substrate is disposed opposite to the first substrate. A seal line partially overlapping the conductive pattern is formed between an edge portion of the first substrate and an edge portion of the second substrate to combine the first substrate with the second substrate.

A motherboard for manufacturing a display substrate according to an exemplary embodiment of the present invention includes a substrate, TFTs, an organic layer, and a guide ring. The substrate includes a plurality of display substrate areas. Each of the display substrate areas includes a pixel part and a driving part connected to the pixel part. The TFTs are formed in the pixel part and the driving part. The organic layer is formed on the substrate having the TFTs formed thereon. The guide ring is formed on the organic layer. The guide ring includes a conductive pattern and a first connection part. The conductive pattern is disposed on the organic layer corresponding to the driving part. The first connection part connects adjacent conductive patterns with each other in a ring shape. The adjacent conductive patterns are respectively disposed on different display substrate areas from each other.

In a method for manufacturing a display substrate according to an exemplary embodiment of the present invention, TFTs are formed in a pixel part and a driving part which are formed on each of display substrate areas of a base substrate. An organic layer is formed on the base substrate having the TFTs formed thereon. A guide ring is formed. The guide ring includes a conductive pattern and a first connection part. The conductive pattern is disposed on the organic layer corresponding to the driving part. The first connection part connects adjacent conductive patterns with each other in a ring shape. The adjacent conductive patterns are formed in the display substrate areas different from each other.

According to the display panel and a method for manufacturing a display substrate, separation of the first substrate and the second substrate may be prevented. Also, corrosion of the gate driving part may be prevented. In addition, defects caused by static charge generated during processes for manufacturing the first substrate may be decreased.

BRIEF DESCRIPTION OF THE DRAWINGS

Exemplary embodiments of the present invention can be understood in more detail from the following descriptions taken in conjunction with the accompanying drawings, in which.

DESCRIPTION OF THE EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein.

It will be understood that when an element or layer is referred to as being "on," "connected to" or "coupled to" another element or layer, it can be directly on, connected or coupled to the other element or layer or intervening elements or layers may be present.

Figure 1:
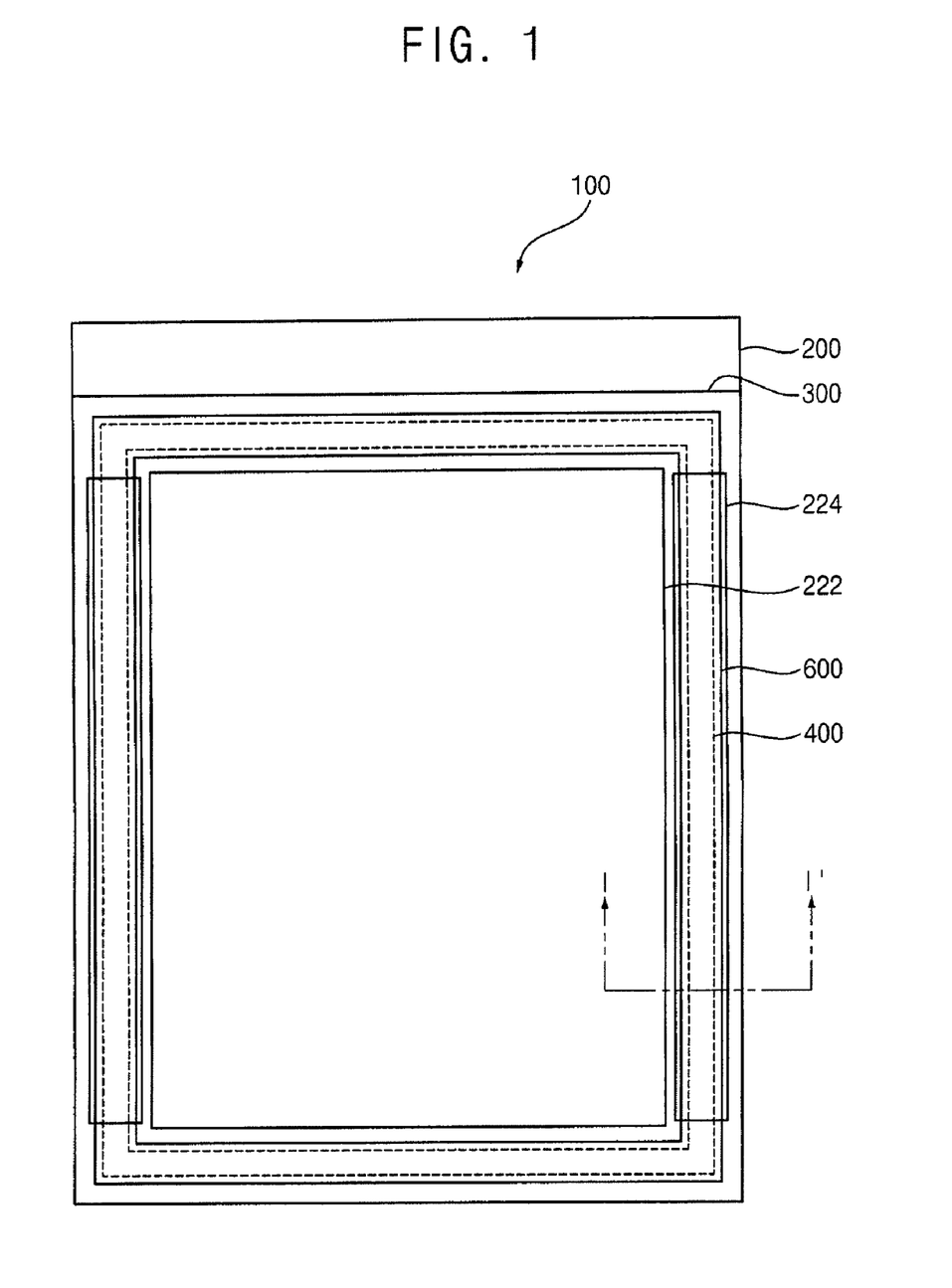
FIG. 1 is a plan view illustrating a display panel according to an exemplary embodiment of the present invention.
Figure 2:
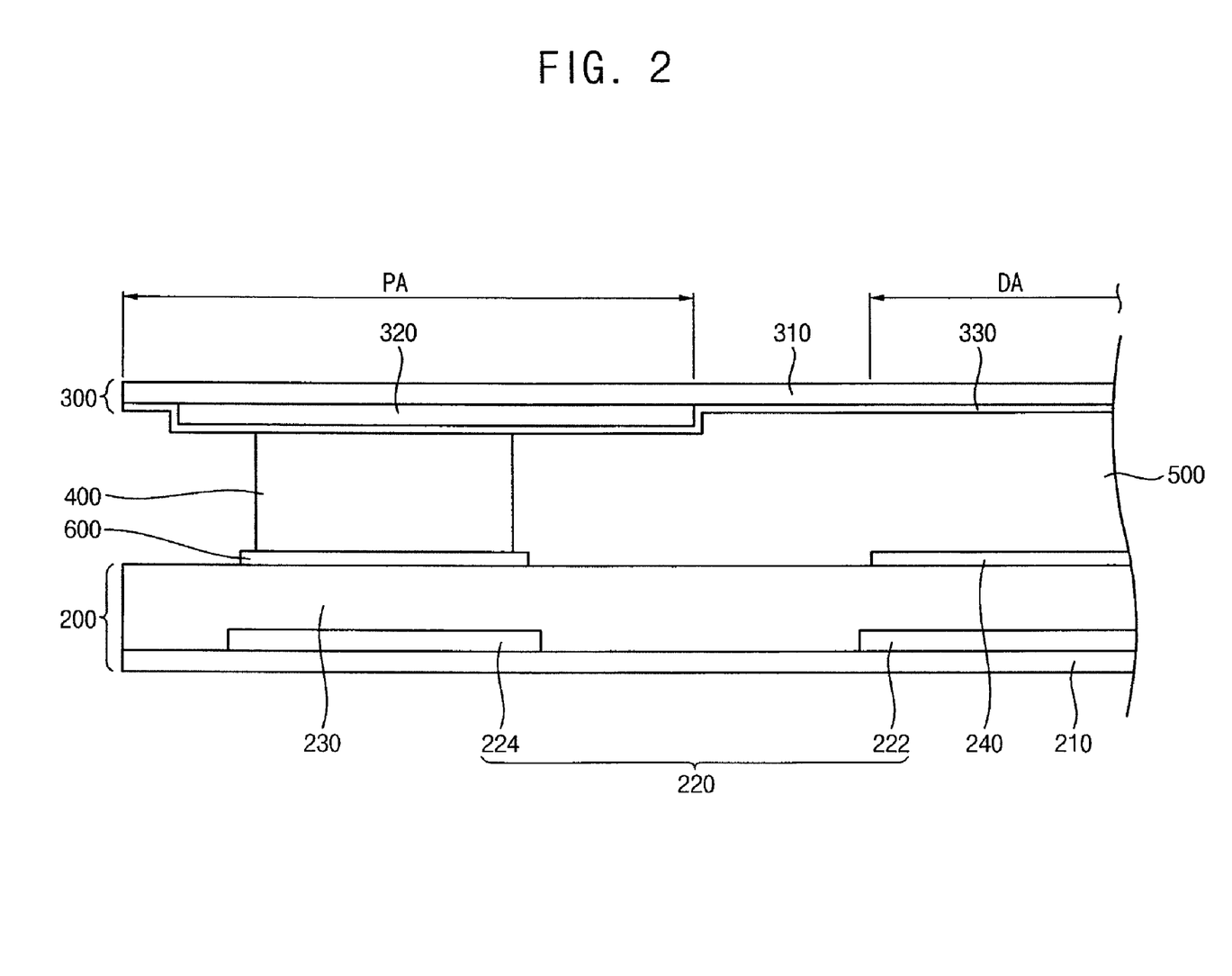
FIG. 2 is a cross-sectional view taken along a line I-I' shown in FIG. 1.

FIG. 1 is a plan view illustrating a display panel according to an exemplary embodiment of the present invention. FIG. 2 is a cross-sectional view taken along a line I-I' shown in FIG. 1.

Referring to FIGS. 1 and 2, a display panel 100 includes a first substrate 200, a thin-film transistor (TFT) 220, an organic layer 230, a seal line 400, and a conductive pattern 600.

The display panel 100 includes a display area DA displaying an image and a peripheral area PA surrounding the display area DA.

The first substrate 200 includes a pixel part 222 formed on the display area DA of a first transparent substrate 210 and a driving part 224 formed on the peripheral area PA of the first transparent substrate 210 and connected to the pixel part 222.

In an exemplary embodiment, the TFT 220 is formed at the pixel part 222 and the driving part 224.

The pixel part 222 divides the display area DA into a plurality of pixels, and drives each of the pixels to display the image. Thus, the pixel part 222 may include a gate line, a data line insulated from the gate line by a gate insulating layer and crossing the gate line, a TFT connected to the gate and data lines, and an overcoat layer covering the data line and the TFT. The pixel part 222 is formed through a thin-film process.

The driving part 224 may include a gate driver sequentially outputting gate signals to the gate lines to drive the TFT. The driving part 224 may be simultaneously formed through the thin-film process when the pixel part 222 is formed. The driving part 224 may be formed in an area in which a first end of the gate line is disposed or an area in which a second end of the gate line is disposed.

The organic layer 230 is formed on the TFT 220. The organic layer 230 planarizes a surface of the first substrate 200. The organic layer 230 may have a large thickness to prevent metal lines formed in the TFT 220 from corroding. For example, the thickness of the organic layer 230 may be in a range of about 2.0 µm to about 3.0 µm.

The organic layer 230 may include, for example, a transparent organic material. In an exemplary embodiment, the organic layer 230 may be formed on the second substrate 300. When the organic layer 230 is formed on the second substrate 300, the organic layer 230 may be formed using a color photoresist material having a red color, a green color and a blue color to remove a color filter layer from the second substrate 300.

The first substrate 200 may further include a pixel electrode 240 formed on the organic layer 230 corresponding to the display area DA of the first substrate 200. The pixel electrode 240 is formed by patterning, and corresponds to each pixel of the pixel part 222. The pixel electrode 240 is connected to the TFT formed in each pixel.

The pixel electrode 240 includes a transparent conductive material. The transparent conductive material may include, for example, indium tin oxide (ITO), and/or indium zinc oxide (IZO). These may be used alone or in a combination thereof.

When the display panel 100 includes a reflection-transmission type display substrate, the first substrate 100 may further include a reflective electrode (not shown) formed on the pixel electrode 240 to reflect light.

The second substrate 300 may include a black matrix and a common electrode 330 formed on a second transparent substrate 310.

The black matrix 320 is formed in the peripheral area PA surrounding the display area DA. The black matrix 320 prevents light from being transmitted through the peripheral area PA. The black matrix 320 also prevents the seal line 400 and the driving part 224 formed in the peripheral area PA from being displayed on a screen. Thus, the black matrix 320 has a width capable of covering the seal line 400 and the driving part 224. When the size of the display panel 100 is increased, the width of the black matrix 320 is increased. Accordingly, the black matrix 320 preferably has a small width. For example, the width of the black matrix 320 may be about 1 mm.

The common electrode 330 is formed on the second transparent substrate 310 having the black matrix 320 formed thereon. The common electrode 330 is opposite to the pixel electrode 240. The common electrode 330 is formed in the display area DA. In an exemplary embodiment, the common electrode 330 may be formed in the display area DA and the peripheral area PA. The common electrode 330 may include, for example, a transparent conductive material. The transparent conductive material may include, for example, indium tin oxide (ITO), and/or indium zinc oxide (IZO). These may be used alone or in a combination thereof.

The second substrate 300 may further include a color filter layer (not shown) having a red color filter, a green color filter and a blue color filter to display a full color image.

The seal line 400 is disposed on an edge portion, which is disposed in the peripheral area PA, between the first substrate 200 and the second substrate 300. The seal line 400 combines the first substrate 200 with the second substrate 300. In an exemplary embodiment, the seal line 400 may be formed using a thermosetting material or a light-curable material.

The seal line 400 may have a smaller width than the width of the black matrix 320 to be covered by the black matrix 320. For example, the seal line 400 may have a width of about 0.5 mm. The seal line 400 overlaps the driving part 224 to further prevent the driving part 224 from corroding.

The display panel 100 may further include a liquid crystal layer 500. The liquid crystal layer 500 is disposed between the first substrate 200 and the second substrate 300. The liquid crystal layer 500 is sealed by the first substrate 200, the second substrate 300 and the seal line 400. The liquid crystal layer 500 includes liquid crystal molecules differently arranged according to a voltage difference applied to the pixel electrode 240 and the common electrode 330 to control transmissivity of light passing through the liquid crystal layer 500.

The conductive pattern 600 is disposed at an area between the seal line 400 and the organic layer 230 to improve adhesive strength between the seal line 400 and the organic layer 230. The adhesive strength between the seal line 400 and the organic layer 230 is decreased, as the width of the seal line 400 is decreased. Accordingly, the conductive pattern 600 having greater adhesive strength against the seal line 400 than the organic layer 230 is interposed between the seal line 400 and the organic layer 230, so that the seal line 400 may be securely combined with the organic layer 230 through the conductive pattern 600. The conductive pattern 600 may be in contact with all of the seal line 400 to prevent the separation of the seal line 400 from the organic layer 230.

The conductive pattern 600 includes a material which more strongly adheres to the seal line 400 than the organic layer 230. For example, the conductive pattern 600 may include, for example, a metal and/or a metal oxide. The conductive layer 600 and the pixel electrode 240 formed in the display area DA may be formed from substantially the same layer to simplify manufacturing processes. For example, the conductive pattern 600 and the pixel electrode 240 may be formed using indium tin oxide (ITO) or indium zinc oxide (IZO). In an exemplary embodiment, when the display panel 100 includes a reflection-transmission type display substrate, the conductive pattern 600 may be formed from substantially the same layer as the reflective electrode, and may include substantially the same material as the reflective electrode.

Since a lower surface of the seal line 400 is in contact with the conductive pattern 600 formed using a metal or a metal oxide, and an upper surface of the seal line 400 is in contact with the common electrode 330 formed using indium tin oxide (ITO) or indium zinc oxide (IZO), the first substrate 200 is stably combined with the second substrate 300. When the black matrix is formed using a metal or a metal oxide, the upper surface of the seal line 400 may be in direct contact with the black matrix 320.

The conductive pattern 600 can improve the adhesive strength between the seal line 400 and the organic layer 230 and prevents the driving part 224 from corroding. Thus, the conductive pattern 600 overlaps the driving part 224. When the seal line 400 overlaps the driving part 224, the conductive pattern 600 overlaps the driving part 224.

The driving part 224 includes a plurality of metal contact regions in which the gate lines are in direct contact with the data lines through contact holes passing through the gate insulating layer. When the pixel electrode 240 is etched, corrosion of the metal contact regions may be generated by defects such as minute holes passing through the organic layer 230. When the pixel electrode 240 is formed, the conductive pattern 600 overlaps the driving part 224 to prevent the corrosion of the metal contact regions.

Figure 3:
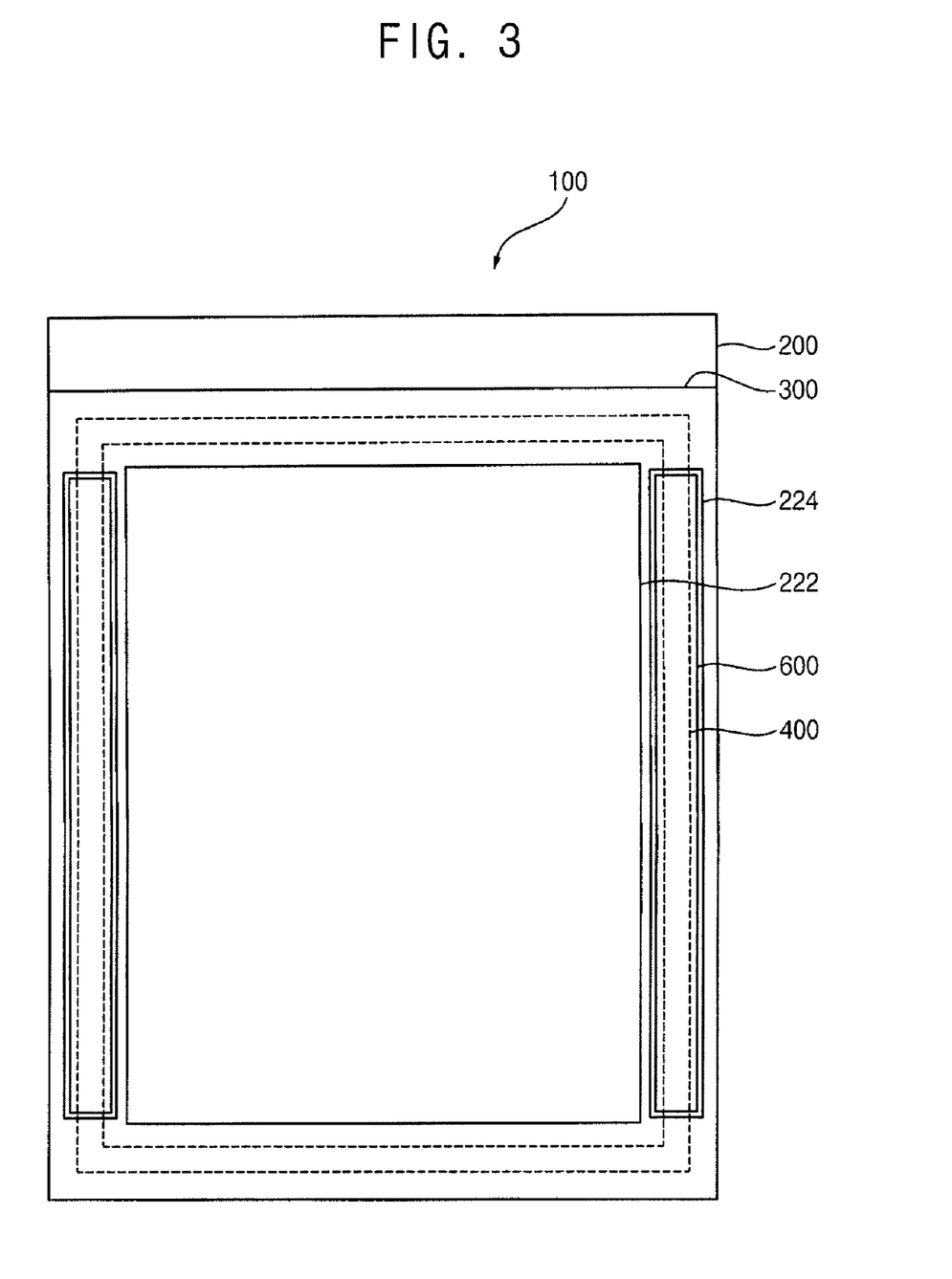
FIG. 3 is a plan view illustrating a conductive pattern according to an exemplary embodiment of the present invention.

FIG. 3 is a plan view illustrating a conductive pattern according to an exemplary embodiment of the present invention.

Referring to FIG. 3, the conductive pattern 600 may not overlap all of the seal line 400 and partially overlap the seal line 400 corresponding to the driving part 224. Even though the conductive pattern 600 partially overlaps the seal line 400 corresponding to the driving part 224, the corrosion of the driving part 224 may be prevented and the adhesive strength between the seal line 400 and the organic layer 230 may be improved.

In an exemplary embodiment, the conductive pattern 600 may be formed only in regions corresponding to the metal contact regions in which the gate lines are in direct contact with the data lines.

Figure 4:
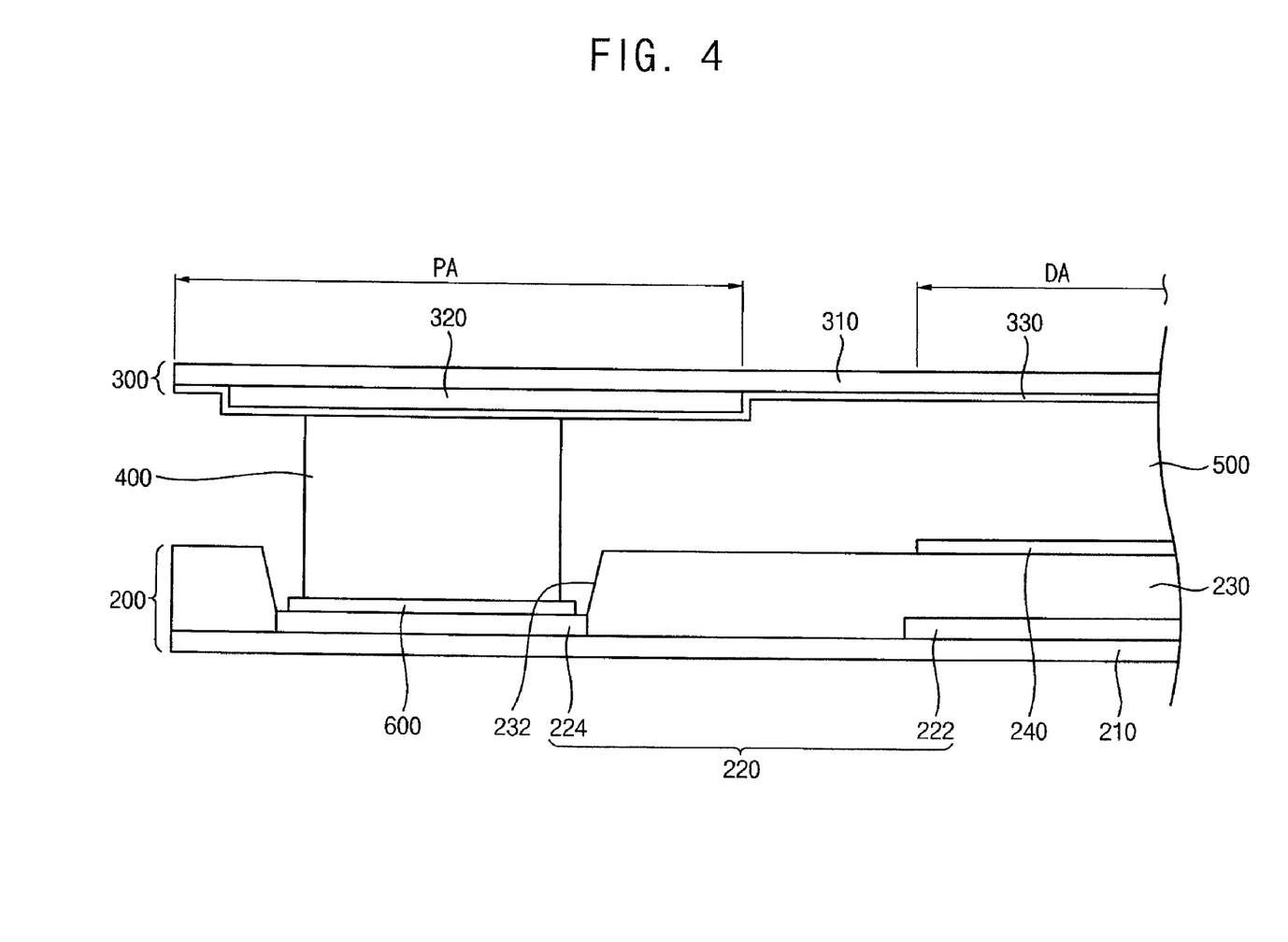
FIG. 4 is a cross-sectional view illustrating a display panel according to an exemplary embodiment of the present invention.

FIG. 4 is a cross-sectional view illustrating a display panel according to an exemplary embodiment of the present invention.

Referring to FIG. 4, a hole 232 may be formed through a portion of the organic layer 230 corresponding to the driving part 224.

When the hole 232 passes through the portion of the organic layer 230 corresponding to the driving part 224, the seal line 400 extends to a region on the driving part 224, and the conductive pattern 600 is formed between the seal line 400 and the driving part 224 in the hole 232. Since the overcoat layer including silicon oxide (SiOx) or silicon nitride (SiNx) is formed on the driving part 224, the conductive pattern 600 improves adhesive strength between the seal line 400 and the overcoat layer and prevents metal lines formed in the driving part 224 from corroding.

Referring to FIGS. 1 and 2, TFTs 220 are formed on a pixel part 222 and a driving part 224 of a first substrate 200.

An organic layer 230 is formed on the first transparent substrate 210 having the TFT 220.

A conductive pattern 600 is formed on a portion of the organic layer 230. The conductive layer 600 is formed from substantially the same layer as a pixel electrode formed on the organic layer 230 corresponding to the pixel part 222 of the first substrate 200.

A second substrate 300 is opposite to the first substrate 200.

A seal line 400 is formed between an edge portion of the first substrate 200 and an edge portion of the second substrate 300. The seal line 400 combines the first substrate 200 with the second substrate 300.

Figure 5:
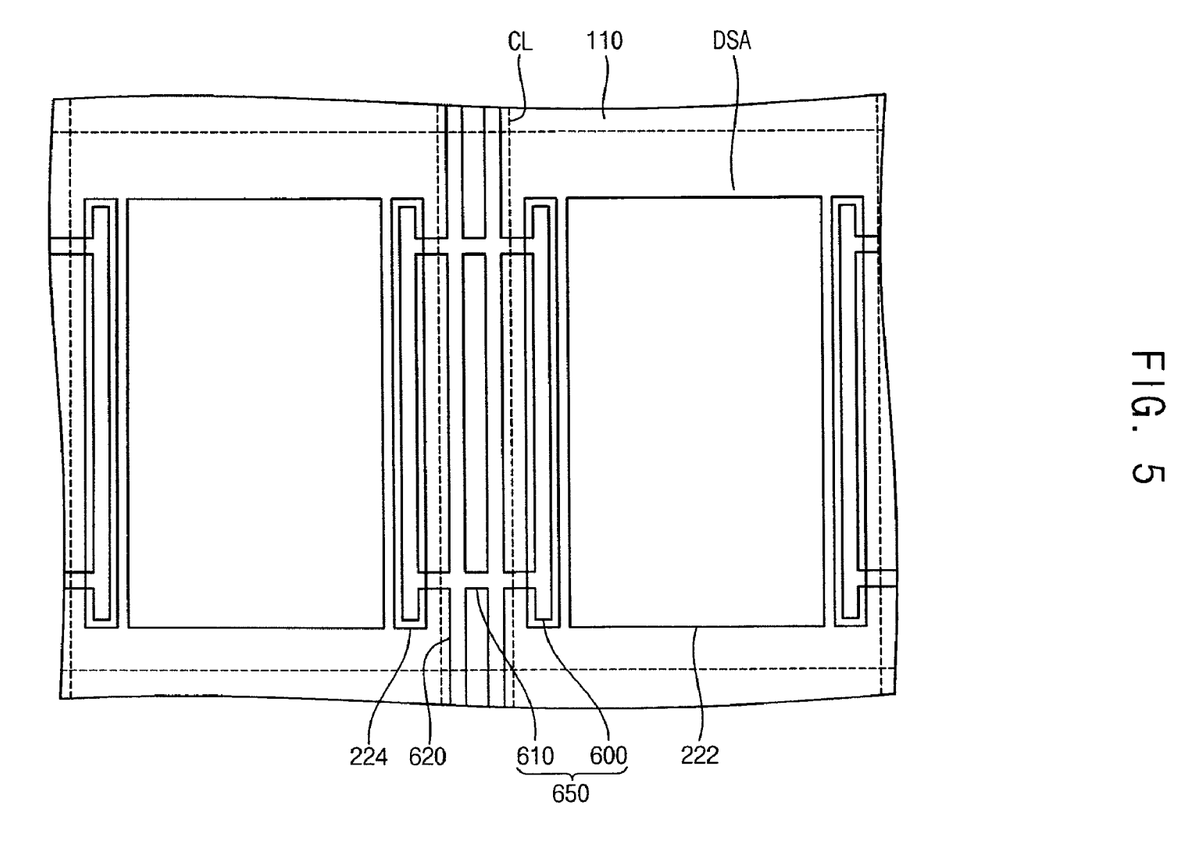
FIG. 5 is a plan view illustrating a motherboard for manufacturing the display panel shown in FIG. 1 and FIG. 2.

FIG. 5 is a plan view illustrating a motherboard for manufacturing the display panel shown in FIG. 1 and FIG. 2.

Referring to FIGS. 2 and 5, a motherboard for manufacturing a display substrate includes a base substrate 110, TFTs 220, an organic layer 230 and a guide ring 650. The base substrate 110 includes a plurality of display substrate areas. Each of the display substrate areas includes the pixel part 222 and the driving part 224 connected to the pixel part 222. The TFTs 220 are formed in the pixel part 222 and the driving part 224. The organic layer 230 is formed on the TFTs 220. The guide ring 650 is formed on the organic layer 230.

The guide ring 650 includes a conductive pattern 600 and a first connection part 610. The conductive pattern 600 is disposed on the organic layer 230 corresponding to the driving part 224. The first connection part 610 is connected to adjacent conductive patterns 600 in a ring shape. The adjacent conductive patterns 600 are formed in the display substrate areas DSA different from each other.

The guide ring 650 is formed from substantially the same layer as a pixel electrode 240 formed on the organic layer 230 corresponding to the pixel part 222. For example, the guide ring may include, for example, indium tin oxide (ITO) or indium zinc oxide (IZO).

The motherboard for manufacturing a display substrate crosses the first connection part 610 between the display substrate areas DSA. The motherboard for manufacturing a display substrate may further include a second connection part 620 electrically connected to the first connection part 610. The second connection part 620 and the guide ring 650 may be formed from substantially the same layer.

Figure 6:
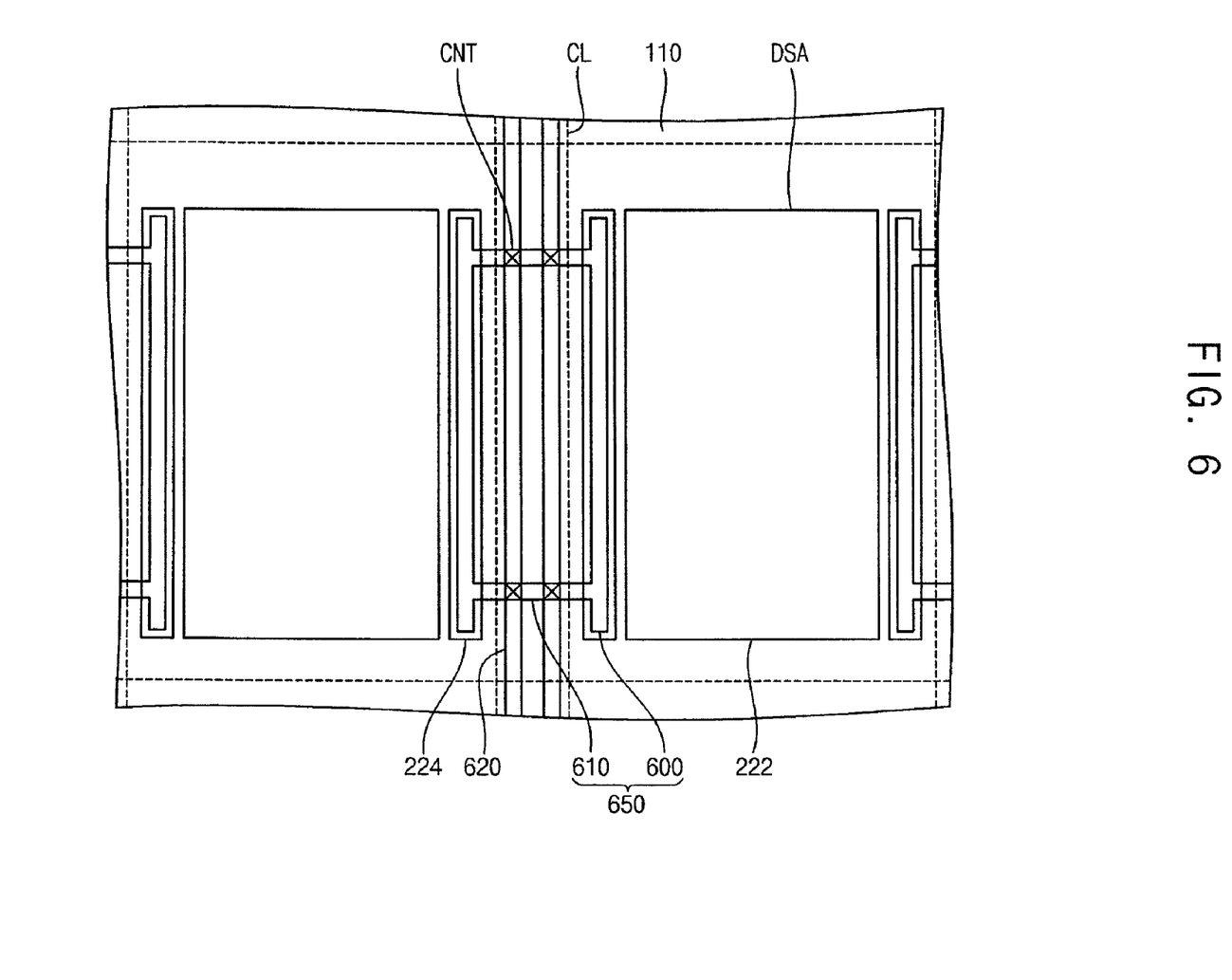
FIG. 6 is a plan view illustrating a second connecting part according to an exemplary embodiment of the present invention.

FIG. 6 is a plan view illustrating a second connecting part according to an exemplary embodiment of the present invention.

Referring to FIGS. 2 and 6, the second connection part 620 may be formed using metal which forms the TFT 220. For example, the second connection part 620 may be formed from substantially the same layer as the gate and data lines of the TFT 220.

Since the organic layer 230 is formed between the guide ring 650 and the second connection part 620, the guide ring 650 is connected to the second connection part 620 through a contact hole CNT passing through the organic layer 230.

Referring to FIGS. 2 and 5, TFTs 220 are formed in a pixel part 222 and the driving part 224. The pixel part 222 and the driving part 224 are formed in a display substrate area DSA. A plurality of display substrate areas DSA is defined on a base substrate 110.

An organic layer 230 is formed on the base substrate 110 having the TFTs 220 formed thereon.

A guide ring 650 is formed on the organic layer 230. The guide ring 650 is formed between adjacent display substrate areas DSA. The guide ring 650 may include, for example, a metal or a metal oxide. To simplify manufacturing processes, the guide ring 650 may be formed from substantially the same layer as a pixel electrode 240 formed in a display area DA. For example, the guide ring 650 and the pixel electrode 240 may include, for example, indium tin oxide (ITO) or indium zinc oxide (IZO).

The guide ring 650 includes a conductive pattern 600 and a first connection part 610. The conductive pattern 600 is disposed on the organic layer 230 corresponding to the driving part 224. The first connection part 610 is connected to adjacent conductive patterns 600 in a ring shape. The adjacent conductive patterns 610 are respectively formed in display substrate areas DSA different from each other. A metal or a metal oxide shaped in a ring shape may effectively disperse static charge generated through a rubbing process of an alignment layer.

The guide ring 650 may further include a second connection part 620 connected to the first connection part 610. The second connection part 620 is disposed between the display substrate areas DSA to cross the first connection part 610. The second connection part 620 may include substantially the same material as the guide ring 650, and may be formed from substantially the same layer as the guide ring 650. An end portion of the second connection part 620 may be grounded. The guide ring 650 and the second connection part 620 connected to the guide ring 650 may further effectively disperse the static charge or prevent the static charge from being generated.

The alignment layer is formed on the base substrate 110 having the pixel electrode 240 and the guide ring 650 formed thereon. The alignment layer is treated through the rubbing process.

When processes for manufacturing the first substrate 200 are finished, the base substrate 110 is cut along a cutting line CL dividing the base substrate 110 into each of the display substrate areas DSA so that the first substrate 200 is completed. When the base substrate 110 is cut, the first connection part 610 disposed between the conductive pattern 600 and the second connection part 620 is also cut. Accordingly, the conductive pattern 600 of the first substrate 200 remains floating.

The first substrate 200 and the second substrate 300 are combined with each other by the seal line so that the display panel 100 is manufactured.

In an exemplary embodiment, after the base substrate is cut to form the first substrate 200, the first substrate 200 and the second substrate 300 are combined to form the display panel 100. However, after a first base substrate including a plurality of the first substrates and a second base substrate including a plurality of the second substrates are combined with each other, the combined first and second base substrates may be cut to form the display panel 100.

As shown in FIG. 6, the guide ring 650 and the second connection part 620 may be formed from different layers from each other to disperse the static charge or prevent the static charge from being generated. For example, the second connection part 620 may be formed from substantially the same layer as the TFT 220, and the guide ring 650 may be formed from substantially the same layer as the pixel electrode 240. Since the organic layer 230 is formed between the guide ring 650 and the second connection part 620, the guide ring 650 is in contact with the second connection part 620 through a contact hole passing through the organic layer 230.

According to the display panel and the method for manufacturing the display panel, a conductive pattern including a metal or a metal oxide is formed between a seal line and an organic layer to prevent separation of a display substrate and a second substrate.

When a pixel electrode is formed, the conductive pattern overlapping a driving part is formed to prevent corrosion of the driving part generated by defects of the organic layer.

In the method for manufacturing the display substrate, the conductive pattern is formed between adjacent display substrate areas in a ring shape so that static charge generated through a rubbing process of an alignment layer may be effectively dispersed or prevented.

Although the exemplary embodiments of the present invention have been described herein with reference with the accompanying drawings, it is understood that the present invention is not be limited to these exemplary embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display panel comprising:
    a first substrate including a pixel part and a driving part connected to the pixel part;
    thin-film transistors (TFTs) formed in the pixel part and the driving part of the first substrate;
    an organic layer formed on the first substrate having the TFTs formed thereon, the organic layer being formed in the pixel part and the driving part;
    a pixel electrode formed on the organic layer in the pixel part;
    a second substrate facing the first substrate;
    a seal line disposed between an edge portion of the first substrate and an edge portion of the second substrate, wherein the seal line combines the first substrate with the second substrate; and
    a conductive pattern disposed between the seal line and the organic layer in the driving part so that the conductive pattern directly contacts each of the seal line and the organic layer, the conductive pattern being formed from a same layer as the pixel electrode.

2. The display panel of claim 1, wherein the conductive pattern comprises a material having a greater adhesive strength against the seal line than the organic layer.

3. The display panel of claim 2, wherein the conductive pattern comprises a metal or a metal oxide.

4. The display panel of claim 1, wherein the conductive pattern comprises indium tin oxide (ITO) or indium zinc oxide (IZO).

5. The display panel of claim 1, wherein the conductive pattern overlaps the seal line.

6. The display panel of claim 1, wherein the conductive pattern is formed on the driving part.

7. The display panel of claim 6, wherein the driving part comprises a gate driver to drive the TFT in the pixel part and overlaps the seal line.

8. The display panel of claim 1, further comprising a liquid crystal layer interposed between the first and second substrates and sealed by the seal line.

9. The display panel of claim 1, wherein the second substrate comprises:
   a black matrix to cover the seal line and the driving part; and
   a common electrode opposite to the pixel electrode.

10. A method for manufacturing a display panel, comprising:
   forming TFTs in a pixel part of a first substrate and a driving part of the first substrate, wherein the driving part is connected to the pixel part;
   forming an organic layer in the pixel part and the driving part of the first substrate having the TFTs formed thereon;
   patterning a metal layer formed on the organic layer to form a pixel electrode and a conductive pattern, the pixel electrode being disposed on the pixel part, the conductive pattern being disposed on a portion of the organic layer to directly contact the organic layer formed in the driving part;
   disposing a second substrate facing the first substrate; and
   forming a seal line partially overlapping the conductive pattern between an edge portion of the first substrate and an edge portion of the second substrate to combine the first substrate with the second substrate, wherein the seal line directly contacts the conductive pattern.

* * * * *